(12) United States Patent
Katz et al.

(10) Patent No.: US 8,714,445 B1
(45) Date of Patent: May 6, 2014

(54) SECURED AND UNSECURED CASH TRANSFER SYSTEM AND METHOD

(76) Inventors: Howard B. Katz, Boca Raton, FL (US); Stephen P. Katz, Woodcliff Lake, NJ (US)

( * ) Notice: Subject to any disclaimer, the term of this patent is extended or adjusted under 35 U.S.C. 154(b) by 0 days.

(21) Appl. No.: 13/561,014

(22) Filed: Jul. 28, 2012

Related U.S. Application Data (60) Provisional application No. 61/574,288, filed on Jul. 29, 2011.

(51) Int. Cl.
*G07F 19/00* (2006.01)
(52) U.S. Cl.
USPC .................. 235/379; 705/21; 705/39; 705/44; 705/66
(58) Field of Classification Search
USPC ............................ 235/379; 705/21, 39, 44, 66
See application file for complete search history.

(56) References Cited

U.S. PATENT DOCUMENTS

| | | | |
|---|---|---|---|
| 6,748,367 B1* | 6/2004 | Lee ................................. | 705/66 |
| 2002/0099607 A1* | 7/2002 | Sosa et al. ....................... | 705/14 |
| 2003/0037012 A1* | 2/2003 | Mersky et al. .................. | 705/75 |
| 2007/0185782 A1* | 8/2007 | Shooks et al. ................... | 705/26 |
| 2007/0244812 A1* | 10/2007 | Turk et al. ....................... | 705/39 |
| 2008/0052227 A1* | 2/2008 | Canard et al. ................... | 705/39 |
| 2011/0040650 A1* | 2/2011 | Johnson ....................... | 705/26.42 |
| 2011/0282788 A1* | 11/2011 | Allison et al. .................. | 705/44 |
| 2012/0197805 A1* | 8/2012 | Chung ............................ | 705/64 |

* cited by examiner

*Primary Examiner* — Allyson Trail
(74) *Attorney, Agent, or Firm* — Thomas A. O'Rourke; Bodner & O'Rourke, LLP (57) ABSTRACT

A method of conveying monetary value between at least two parties, may utilize a computer system or a vending machine. A first party requests an amount of monetary value to be in one or more desired incremental monetary amounts, and provides a payment. A system administrator requests a personal identification number (PIN), which is associated, within an administrator database, with a Globally Unique Identifier (GUID) that is located on one or more QwikCash tickets, which are thereby activated, and thereafter issued to the first party. The GUID is machine scannable, and each QwikCash ticket may comprise a textual reference denoting its incremental monetary amount, and a textual reference identifying issuance of the PIN. The first party may use the PIN and remit the QwikCash ticket: to a second party, as a person-to-person monetary transfer; to a merchant for making a purchase; or to a bank ATM in exchange for cash.

18 Claims, 11 Drawing Sheets

FIG. 2
(QwikCash Exchange System)

FIG. 3
(QwikCash Value Transfer Via Banks)

FIG. 4
(QwikCash Electronic Bill Pay)

FIG. 5
(QwikCash Purchase at Vending Machine)

FIG. 6
(Sample QwikCash Thank-you E-Mail Sent to a Customer)

FIG. 7
(Example of a Greeting card with Attached QwikCash)

SECURED AND UNSECURED CASH TRANSFER SYSTEM AND METHOD

CROSS REFERENCES TO RELATED APPLICATIONS

This application claims priority on U.S. Provisional Application Ser. No. 61/574,288, filed on Jul. 29, 2011, and having the same title. The disclosures of U.S. Provisional Application Ser. No. 61/574,288, filed on Jul. 29, 2011 are hereby incorporated herein by reference. The disclosures of U.S. Provisional Application Ser. No. 61/574,031, filed on Jul. 26, 2011, having the title "Appeal ID Fundraiser System," are also incorporated herein by reference.

FIELD OF THE INVENTION

The present invention relates to improvements in cash transfer systems, and more particularly to a system and method which are capable of providing more flexibility while permitting greater on-demand and reversible security for such transfers.

BACKGROUND OF THE INVENTION

There are many instances in daily life where a person requires the ability to transfer readily redeemable value to another party. Until recently, the most easily transferrable value has been by the exchange of cash money, whether it had been commodity money, representative money redeemable for the deposited commodity, or just fiat money that is issued by a government's decree of legal tender. The system of exchanging coinage or bank notes for goods or services or for the making of loans or gifts, was far superior to the direct exchange of goods or services in a barter arrangement, Cash, as well as negotiable instruments in the form of checks, had provided the ability for individuals to travel spontaneously and over long distances using every available means of transportation, while still possessing the ability bring along their purchasing power.

The invention by IBM of automated teller machines to provide ready access to the user's cash through use of an ATM card and a personal identification number, provided even greater flexibility, because the person did not need to keep the cash on his/her person. However, the transferability of any monetary value is thereby limited to the person's ability to access an ATM machine to withdraw cash, and to then physically transport the cash to the desired party. The money transfer service provided by Western Union as of 1871, which is available still today, pe pitted a party to transfer cash to a recipient over long distances, but the recipient needed to pick up the cash at the location of the company's nearest agent. Pre-paid gift cards (as opposed to credit cards) from companies such as Visa and MasterCard provide some additional capabilities, because the gift card number may be communicated verbally or via email to a recipient, who may thereafter use the amount on the gift card. But these cards are somewhat limited in flexibility. Although they may be purchased online rather than in person, they are limited in usage to making a purchase, and furthermore, there is little or no inherent security because the card number is not encrypted and may therefore be used by anyone.

While some traditional forms of making a payment have been adapted to address the issues surrounding the need for a more fungible medium of exchange, they still do not provide the requisite amount/degree of access, flexibility, or transferability in a world that is increasingly dependent upon the electronic medium to instantly conduct commerce or to just interact. For example, the system known as PayPal™ is constructed to allow payments and money transfers through the internet, and in many respects represents a substantial improvement over a Western Union money transfer. PayPal can be used to send money via the internet directly to the recipient, but it requires the recipient to sign-up with PayPal. Thereafter, the recipient may spend the amount online, or transfer it to his/her bank, or may request a check, or he/she may use the amount through a PayPal debit card. But fungibility is funneled through PayPal, and is thereby limited, and it is certainly not anonymous.

Inventions found within several recent U.S. Patents have sought to address some of the above-mentioned restraints and drawbacks. For example, U.S. Pat. No. 6,239,981 to Hill for a "Transaction system" discloses a "carnet or a set of digital payment tokens which comprises a set of random numbers in a determined sequence." These digital payment tokens represent an improvement over the previously mentioned prepaid gift cards in that the digital payment tokens may be secured by encoding a "user-specific key" into the random numeric sequence. However, these tokens nonetheless have some of the other drawbacks, being, for example, that they typically require that "all three of the user, the merchant and the payment server will be linked by internet connections." A similar system is offered by U.S. Pat. No. 7,814,009 to Frenkel for "Anonymous On-line Cash Management System," which may "convert funds into anonymous currency having a serial number associated therewith." However, the Frenkel system requires that the money transferred by the customer be "converted into an electronic or on-line form of currency and placed into a numbered account." Requiring a numbered account contravenes the aforementioned anonymity and flexibility that needs to be afforded the user.

The system and method of the current invention addresses these problems in providing an anonymous, flexible, and highly fungible medium of exchange.

SUMMARY OF THE INVENTION

The present invention discloses an article, for use in storing and transferring monetary value. The article may comprise a readable medium (printed/printable article or electronic article) that includes a globally unique identifier (GUID) being assigned to and/or overlaid upon, the readable medium, and a textual reference denoting the monetary value. The GUID may comprise a programmatically encoded visual image, which may correspond to a requested monetary value. The encoded visual image may be readable by a seamier and be thereby interpreted to be accorded the requested monetary value. The programmatically encoded visual image and the corresponding monetary value of the GUID may be so associated within a database of an issuer/administrator.

The GUID may be a simple two-dimensional barcode, or a data matrix barcode. The article may be secured for a particular purchaser by encoding, within the GUID, of a PIN number, which may be needed for redemption of the ticket. Instead of a PIN number, biometrics may be used for security. For example, at the time of purchase, the requestor may have his/her fingerprint scanned and be encoded within the visual image, and also be stored within the database of said issuer.

Alternatively, instead of recording data within a GUID matrix barcode, the GUID may comprise a randomly generated image that serves to identify the associated data that is stored within the database of the issuing company. The randomly generated image may be identified through the use of image recognition technology.

The article, which may be in the form of a ticket, may be purchased at a vending machine using cash, credit cards, etc. Alternatively, the ticket may be purchased online using a PC or a smart phone. Value may be transferred by exchanging the ticket between parties, whether a paper copy or a forwarded emailed copy of the ticket. Redemption may be at/with a merchant or bank having appropriate point-of-transaction scanning equipment, which may authenticate the ticket's validity, and verify the user's ownership, if a PIN or biometrics was used to secure the monetary amount.

DETAILED DESCRIPTION OF THE INVENTION

The system of the present invention comprises a new and unique method of effecting payment from a purchaser to a merchant, or of simply conveying monetary value between two parties without a corresponding exchange of goods/services. The method herein employs the use of a unique article, which is termed herein as "QwikCash," and which is advantageous over other exchange methods and articles because it does not need to have an account associated with it, so transferring monetary value does not require either party to have a relationship with a Bank or other similar financial institution. QwikCash may thus maintain the anonymity of its users, and it furthermore may be transferred electronically or physically, as well as being convertible between those mediums, and it may also be transferred between indefinite numbers of parties.

Figure 1A:
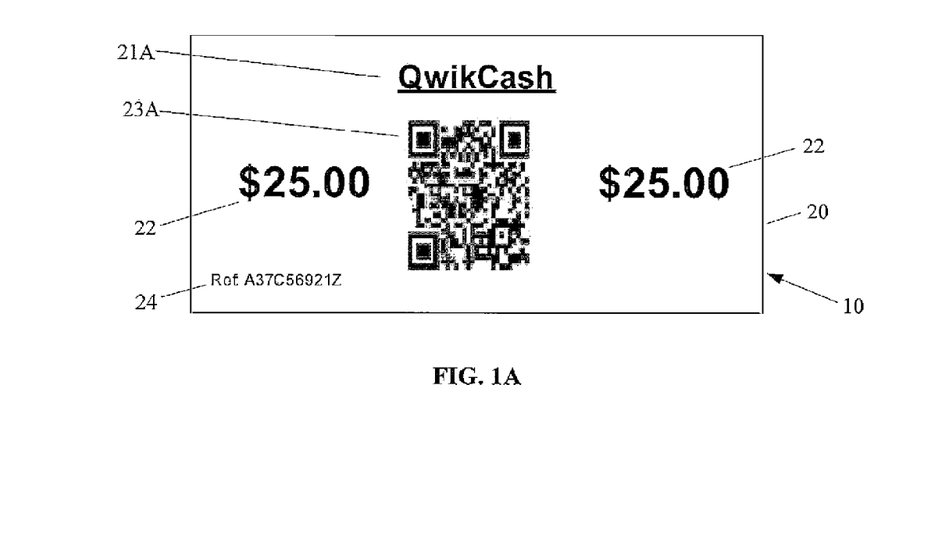
FIG. 1A is a first embodiment of a printed copy of the QwikCash of the current invention, using a matrix barcode (GUID) and having text describing the value associated with it.

A first embodiment 10 of the QwikCash of the current invention is shown in FIG. 1A. The QwikCash 10 may be issued in one of several different forms. The QwikCash may be issued in some form of printed media, such as by the printing of a paper ticket that may be similar to the receipt that is discussed in U.S. Pat. No. 6,533,168 to Ching, the disclosures of which are incorporated herein by reference. The QwikCash paper ticket 10 may have a border 20, onto which may be printed the trademarked name of the issuer of the ticket. In the case of the QwikCash paper ticket 10 illustrated herein, the name being shown is simply "QwikCash." The QwikCash paper ticket 10 may also have printed thereon, at least one instance of a textual identifier, which denotes the monetary amount 22 of the article that had been requested and paid for by the purchaser.

The monetary amount of any type of ticket is a concern of the manufacturer/distributor, because it is subject to being fraudulently altered to entitle the bearer to a greater monetary value. There may also be concern as to counterfeiting of the ticket. To ensure the integrity of the QwikCash ticket 10 herein, in terms of its unredeemed value, the ticket 10 may make use of a Globally Unique Identifier (GUID). The GUID may comprise a pre-determined unique number, being analogous to a serial number, and may also comprise the issued monetary value for the ticket. The unique number may include, but is not limited to, alphabetic or numeric characters and/or other symbols and characters. The GUID may alternatively be a programmatically encoded visual image or pattern. At the time of purchase, a personal identification number (PIN) may also be encoded into the GUID or may need to be used in conjunction with its redemption, which may limit the transferability of that monetary value to only that particular user, and to whomever that user discloses the pin and transfers the ticket. The PIN may comprise alphabetical characters, numeric characters, or symbolic characters (e.g., #, $, %, &, etc) found on a standard QWERTY keyboard, or any combination of those characters.

The encoded GUID may also be in any suitable form including in the form of a linear bar code, such as the Universal Product Code (UPC) having 12 numerical digits represented by a scannable strip of black bars and white spaces, or the European Article Number (EAN), being a 13 digit (12 data and 1 check) bar coding standard. In addition, as seen in the QwikCash 11 example of FIG. 1B, the GUID may be a stacked barcode 23B. In general, a barcode is an optical machine-readable representation of data, being represented, in one embodiment, by varying the width and spacing of a series of parallel lines. The traditional linear or uni-dimensional barcode only stores information horizontally and thereby records and permits retrieval of data about the object to which it is associated. The data may be retrieved through the use of a special optical (laser) scanner.

A matrix barcode is a similar type of graphical image, however, it stores information both horizontally and vertically, with this construction permitting the storage of thousands of characters, which is significantly greater than the capacity of standard unidimensional barcodes. A matrix barcode consists of black and white cells that are arranged in square or rectangular patterns. The information encoded within such a matrix barcode can be either text or raw data. A data matrix symbol can store up to 2,335 alphanumeric characters. More detailed information regarding the specifications for, and use of, barcodes may be found in the book titled, "The Bar Code Book Fifth Edition—A Comprehensive Guide To Reading, Printing, Specifying, Evaluating, And Using Bar Code and Other Machine-Readable Symbols," by Roger C. Palmer, and in the website at www.adams1.com/stack.html, the disclosures of each being incorporated herein by reference.

The GUID may also be a matrix barcode in the form of a Quick Response (QR) barcode, which is a matrix barcode that was designed to allow its contents to be decoded at high speed, and may thus be quickly read by a reading means such as a smart phone. The QR code is readily identifiable by its three distinctive squares at the corners of the image (see FIG. 1A). In one embodiment, the QR barcode may be encoded with a Uniform Resource Locator (i.e., www.qwikcash.com) and a unique identifier (i.e. 12344557788). This would allow generic off-the-shelf Smartphone QR barcode readers, such as the Smartphone APP "Red Laser," to read the URL and unique identifier on the QwikCash, which may prompt the question of whether the user wants to go to that website. If the response is "yes," then the unique identifier is sent to the QwikCash system.

In addition, the data contained within the QR barcode may be encrypted using the Data Encryption Standard (DES) or triple DES, so that merely having a scanner capable of reading the GUID does not necessarily permit the person to gain access to the information thereon, which may include the pin number, as well as the currency type used for purchase, a purchase date, the reference number, and, if not anonymous, the purchasers' name and email address. The person legitimately permitted to access the information thereon may have the scanner and a key for decryption. This would permit certain vendors to increase security in the transaction to also utilize a scanner to read the bar code and to utilize the particular decryption software, which may verify that the bearer is the proper owner, by requesting the person who tendered the QwikCash to also key in the associated PIN. The software would compare the entered PIN with the decrypted PIN, and where matched, the software would inform the vendor to accept the QwikCash in exchange for goods or U.S. currency.

Figure 2:
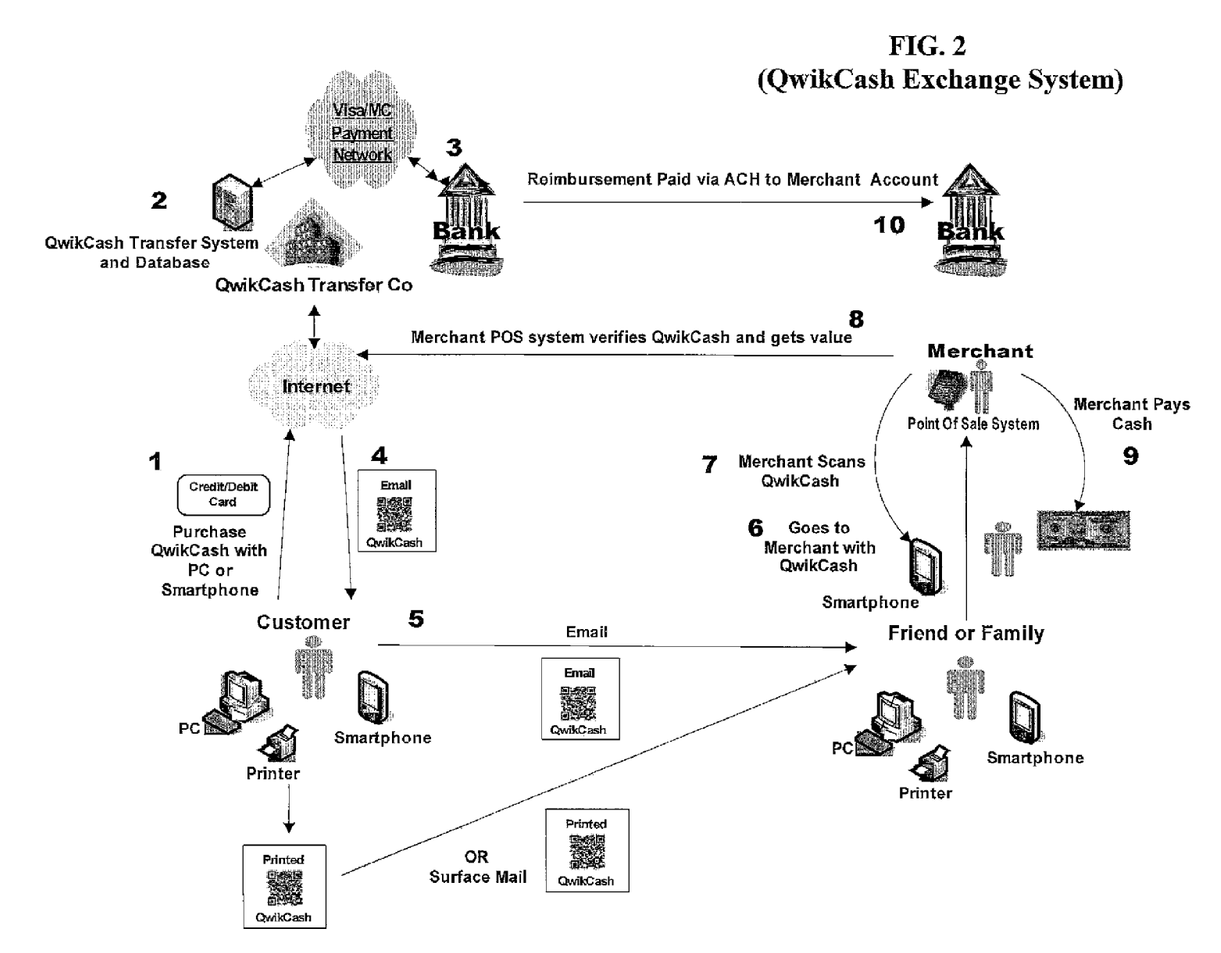
FIG. 2 is a diagram illustrating the steps of the process in the QwikCash exchange system.

One series of possible exchanges of the above described QwikCash is shown by FIG. 2. At step 1, a purchase may be made by a customer (a first party). The purchase may be made online using a laptop or tablet device or desktop PC, or may even be instantly purchased at an unusual mobile location through the use of the person's smart phone. The purchase may be paid for through the use a credit card, a debit card, a gift card, or any other online e-commerce payment means, including, but not limited to PayPal™. When the person makes a purchase for a total monetary value of QwikCash, he/she may be given the option to request specific incremental monetary amounts to be distributed evenly or unevenly among a plurality of QwikCash tickets. For example, the person may request a single coded QwikCash ticket having a total value being equal to the full purchase amount, e.g., for $100. Alternatively, the purchaser may elect to receive two or more QwikCash tickets with individual GUIDs. For example, for that same $100 purchase of QwikCash, the person may request and receive one QwikCash ticket with GUID corresponding to the amount of $25.00, a second QwikCash ticket and GUID in the amount of $25.00, a third QwikCash ticket and GIUD in the amount of $30.00, and a fourth QwikCash ticket and GUID in the amount of $20.00. This flexibility would enable the purchaser to receive multiple QwikCash tickets in one purchase, which could then immediately be sent to various different recipients, such as a relative buying cash gifts for nieces and nephews who may then email the individual tickets to them.

Figure 5:
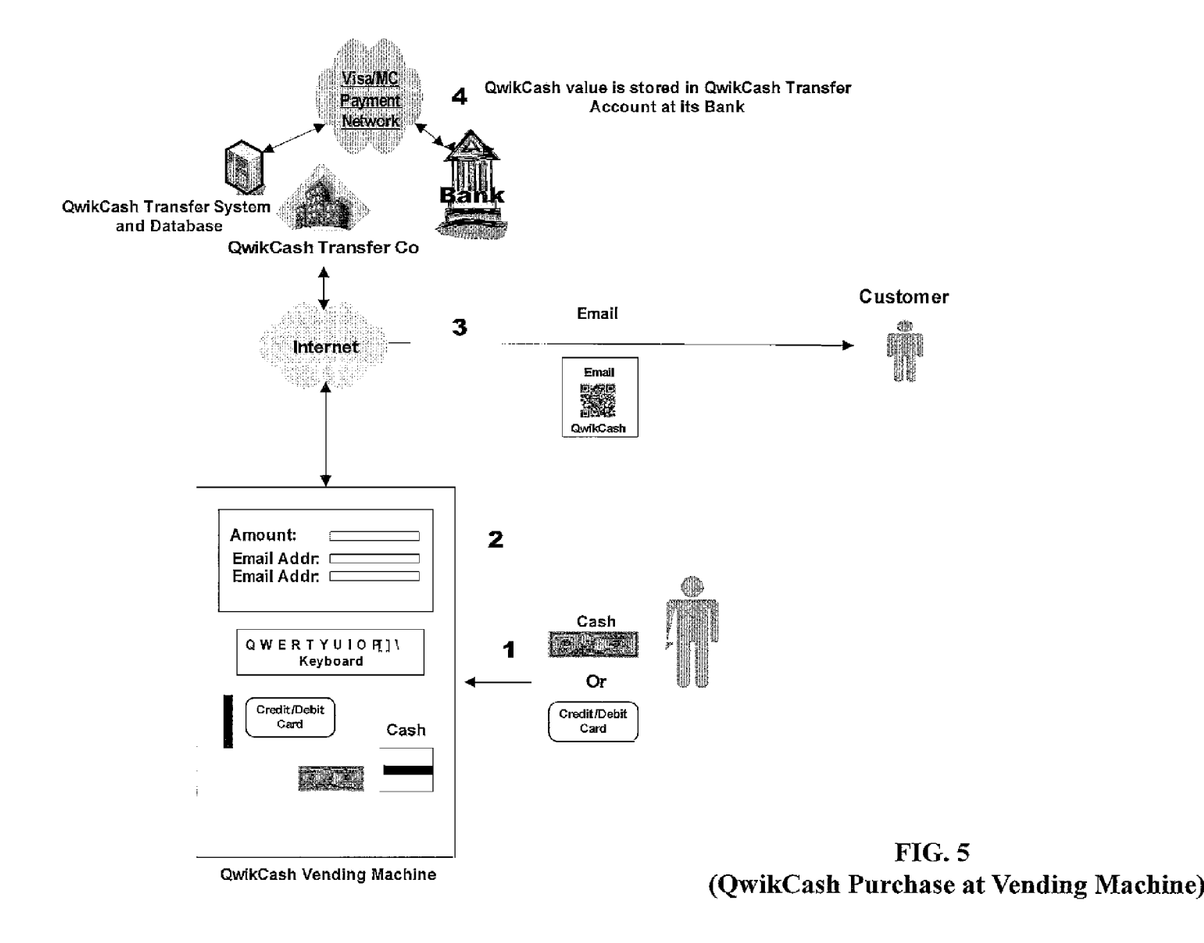
FIG. 5 is a diagram illustrating the steps in the purchase of QwikCash at a Vending machine.

In addition, vending machines may be electronically connected (have an internet connection) to the issuing company and be equipped to vend a requested QwikCash ticket to a person physically located at the vending machine (see FIG. 5), which may include a PIN that is chosen and entered by the purchaser.

Vending of the tickets may also occur through person-to-person sales at a kiosk or store, in a similar manner to the sale of lottery tickets. At such locations, a purchase may be made using a check, or even cash, which would serve to maintain the anonymity of the purchaser. QwikCash tickets may thus also be preprinted and distributed to retailers for sale to the public. Preprinted tickets may even be sold at generic vending machines (having no internet access). In an embodiment where a ticket is purchased at a vending machine or store location that does not possess an inventory of pre-printed tickets, an electronic request, preferably being made across the internet, may be transmitted by the retailer to the issuing company. In FIG. 2, the issuing company is referred to as the QwikCash Transfer Co., which may hold the monetary value until it is redeemed. When the QwikCash Transfer Co. receives the request, it may generate the appropriate GUID by encoding thereon, one or more of: the monetary amount, a unique serial number to support authentication of the ticket, and a PIN number, if one was requested by the purchaser.

Figure 1B:
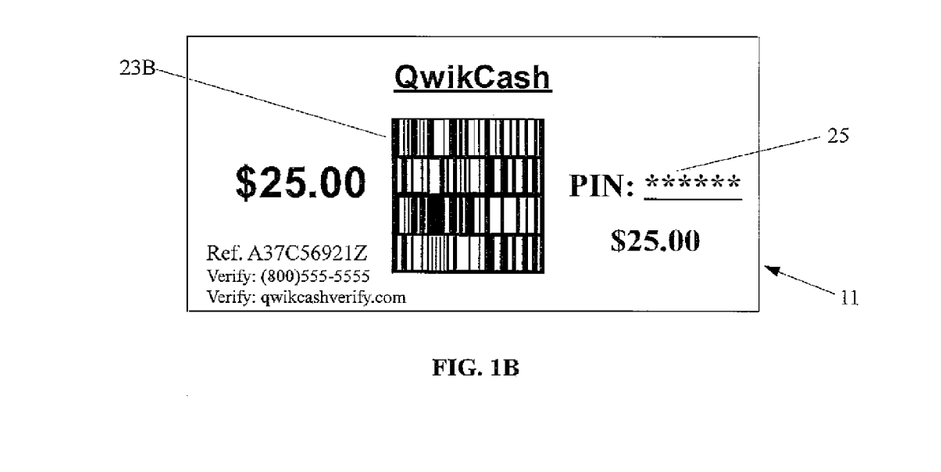
FIG. 1B is a second embodiment of a printed copy of the QwikCash of the current invention, using a two-dimensional barcode (GUID) and having text describing the value associated with it.
Figure 8A:
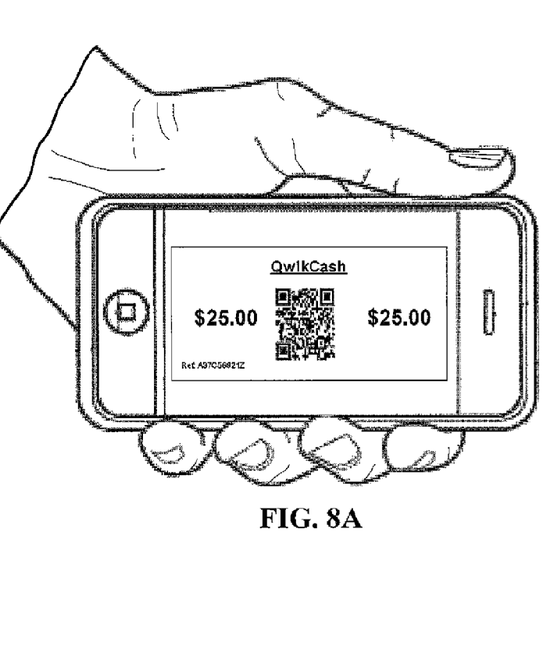
FIG. 8A is a smart phone displaying an electronic version of the QwikCash embodiment of FIG. 1A.

The GUID may be electronically generated and returned over the internet in the email of step 4 to the requester, and be in the form shown within FIGS. 1A and 1B. The GUID may also be simultaneously stored on a database of the administrator of the system at the QwikCash Transfer Company, in an administrator database. Where a consumer decides to purchase a ticket from a kiosk or store, the ticket may nonetheless have a PIN associated with it, as it may be located in a separate, sealed pouch that may be attached to the ticket. In this embodiment, the PIN would not be user-selected at the time of purchase and would be assigned by the QwikCash Transfer Co. when it generated and packaged with the ticket. Another provision for these tickets could also permit the purchaser to elect, either at, or subsequent to, the time of purchase, to have the PIN that was packaged with the ticket be enabled. Enablement of the PIN could be by either the retailer or the purchaser making a phone call to the QwikCash Transfer Co. to trigger activation of the PIN. The pin may also be selected and activated online by the purchaser or retailer at the time when it is purchased. A secondary provision could also permit the purchaser to change the PIN by phone, on using the website of the QwikCash Transfer Co. This altered PIN would not be incorporated within the GUID shown on the face of the QwikCash 10 or 11, but the original PIN encoded within the GUID would be correlated within the administrator database at the QwikCash Transfer Co., with the new PIN that was selected by the purchaser. For commercial reasons relating to the economics of producing the QwikCash, two separate types of preprinted tickets may preferably be manufactured—one that may not include a PIN and one that may permit a PIN to be activated as discussed above.

Where the ticket is received over the internet onto a purchaser's smart phone, which is illustrated, for example, in FIG. 8A, the ticket could either be printed from the phone, or be used in its electronic form, as discussed hereinafter. Where the QwikCash was received by the purchaser over the internet on a desk-top computer, laptop, tablet, Smartphone, or any other smart device (herein simply referred to as "computer" or "computer system"), the ticket may be printed on paper using a standard printer, as seen in FIG. 2. Since this could also lead to misuse or abuse of the ticket and process, because multiple copies may be printed out with the intent of redeeming the value, either through inadvertence, or by a deliberate act, such as by a family member discovering the email or a copy of the ticket stored on the computers desktop. Where a ticket is purchased and is not secured by a PIN, it must be disclosed that it is as fungible as paper cash and the purchaser needs to take precautions to guard it the same as he/she would protect a comparable cash dollar amount. A good precaution would be for the purchaser to print out the ticket, and then immediately delete the email, or instead use a PIN.

In the case of a lost ticket that has not already been cashed in, a request by the purchaser could also be accommodated over the internet to resend a replacement ticket to the user's email, in a similar fashion to when an online member of a particular retailer/service provider, such as Amazon.com, forgets his/her password. The process may also serve to deactivate the GUID of the lost/stolen ticket. Where the purchaser requested a ticket with a pin number, the ticket, as seen in FIG. 1B for QwikCash 11, may have noticeably printed on its face, a PIN code signifier 25. The PIN code signifier 25 would of course not be the actual code, but would simply signify to, or alert, the holder of the ticket that the corresponding PIN will be required to redeem that particular ticket for its face value. A ticket that was not purchased with a PIN to secure the monetary amount, which may be more prevalent for smaller purchased dollar amounts, may resemble the QwikCash 10 of FIG. 1A, and be without the PIN signifier, irrespective of the type of barcode utilized.

Figure 6:
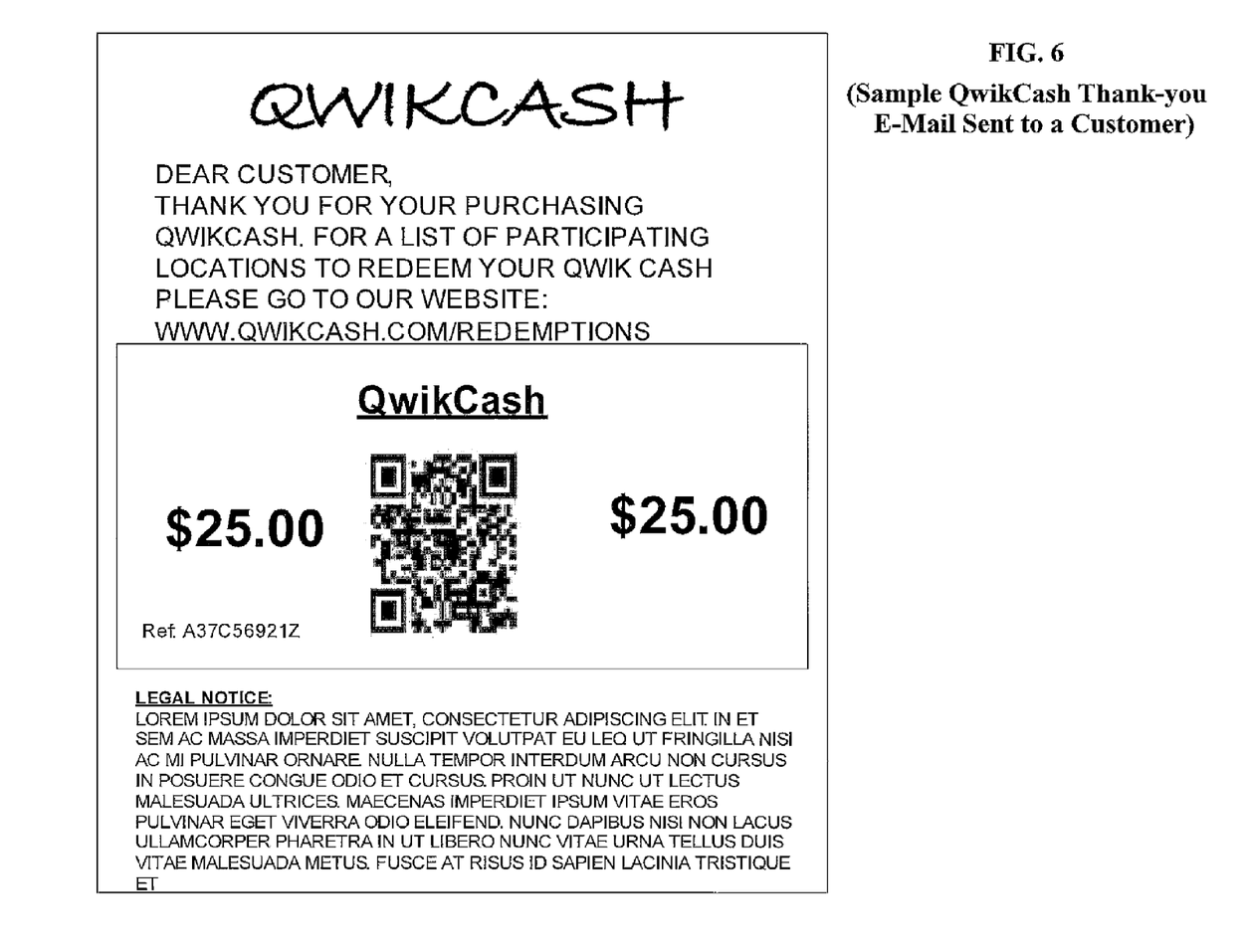
FIG. 6 is an example of a QwikCash thank-you e-mail sent to a customer who made a purchase.
Figure 7:
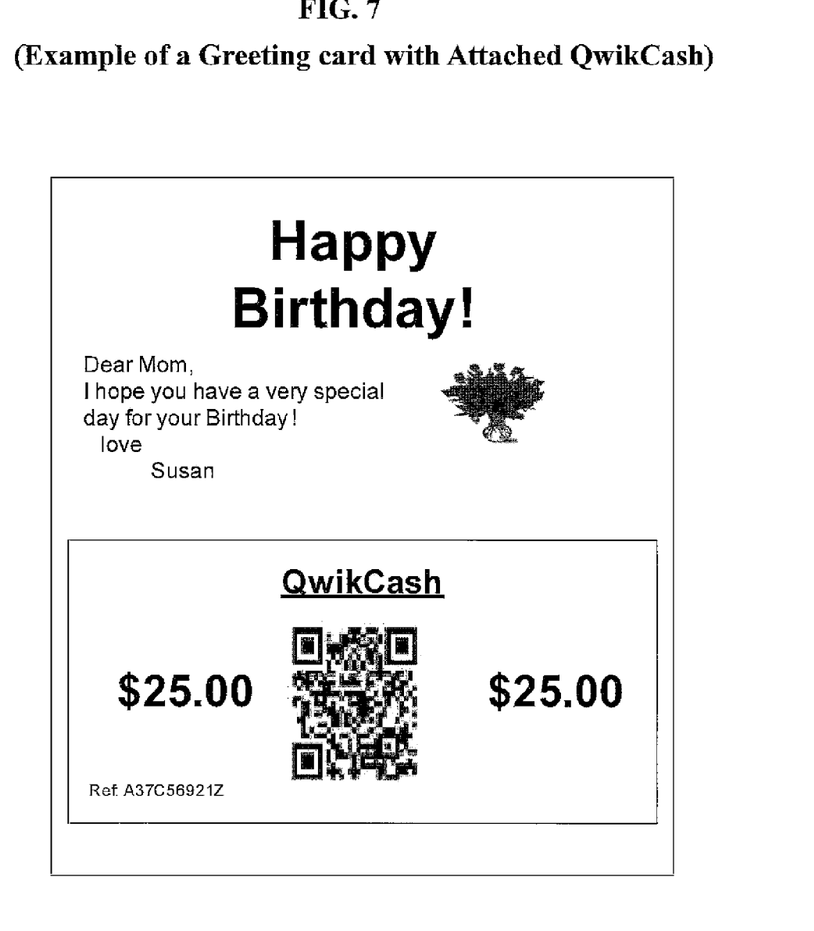
FIG. 7 is an example of a Greeting Card with attached QwikCash.

As seen in FIG. 2, once the ticket is paid for and received, the purchaser may utilize the monetary value of the ticket themselves, or may give it to a friend or a family member, or may use it to pay a debt to a third party. To convey the value, the purchaser may simply forward the email to that person, or may exchange the printed ticket either in person or through regular U.S. mail. If the conveyance is intended to be a gift, the purchaser may be presented at the time of purchase with the option of receiving the QwikCash in the form of a greeting card, which is illustrated in FIG. 7. In lieu of requesting a greeting card format, the user may instead receive a generic email, such as the one shown in FIG. 6.

To better facilitate such transfers of the monetary value of a QwikCash ticket, particularly where the amount is substantial, the recipient may wish to verify that the ticket is unredeemed and remains active. This may be accomplished by providing the purchaser of the ticket with a reference number 24, for example, on a separate receipt or other record received by the purchaser at the time of the transaction or at some other time, or alternatively by printing the reference number directly on the QwikCash ticket. The purchaser, or other person who has received the reference number from the purchaser, may contact the issuer by, for example, calling a toll-free number shown on the ticket to verify the unredeemed value using the reference number 24. A website may also be set up to permit online verification of the unredeemed value using the reference number. When used by itself, the reference number may only allow the caller to verify whether the ticket has been used and/or to verify the ticket's unredeemed value. However, when the transferee has been given the ticket and the corresponding PIN, the transferee may call the toll-free number or use the website and use the PIN to create a new PIN number to personally secure the face value of the QwikCash. The reference number may never be used to make a purchase or to obtain cash for the ticket, as this may only be accomplished using the GUID.

In step 6 of FIG. 2, the person in possession of the QwikCash may engage a merchant who possesses a point-of-sale system adapted to read the GUID of the present invention, such as a 7-Eleven store. Upon tendering of the ticket to the merchant, with the intent of acquiring merchandise or the cash value or to preliminarily verify it is unredeemed, the merchant may scan the ticket's GUID. The scanner may be adapted to either scan/read the paper ticket, or it may scan/read the GUID in the display screen of the smart phone of FIG. 8A, which may be held up to the scanner. The point-of-sale system may preferably have the appropriate proprietary/internet connections with the issuer—the QwikCash Transfer Co.—to permit authentication of the ticket. Upon authentication, the merchant may pay the cash to the ticketholder, and the QwikCash Transfer Co. will update its QwikCash record in the database to indicate that the particular ticket has been redeemed and becomes deactivated, so that it may not be used again. If the Merchant's currency type is not the same currency that was used to purchase the QwikCash, then a calculation will be made by the QwikCash Transfer System to convert the purchased value to the Merchant's local currency. The Merchant may disburse funds in the local currency. Where the QwikCash is used to purchase a product, e.g., for the purchase of a $90 souvenir for which the purchaser tenders a $100 QwikCash ticket, the remaining balance may be handled using one of several different methods. The system may print out a new QwikCash ticket for the change of $10.00 that is due to the customer, or the vendor could issue a new gift card or debit card, or an existing credit/debit card could be credited with the $10.00, or cash money could be used to make up the difference.

More details regarding the GUID may inform the user of the system as to how it may better comprise a globally unique number. The GUID matrix barcode may comprise different pieces data regarding details of the QwikCash purchase, including, but not limited to: the QwikCash value, the currency type (dollars, Yen, Pesos, etc), a purchase date, the reference number, and a customer name and/or email address (if not anonymous). The information contained in the two-dimensional barcode may also be encrypted for security reasons. Note that the transaction sent by the merchant's point-of-sale system to the QwikCash Transfer System may be one or more ANSI X12 transactions that are commonly used by inventory control and point-of-sale systems to lookup up product information and control inventory product counts. The transaction may also be of a custom and proprietary nature that is privately agreed to and developed by the operators of Pont-of-Sale systems and the QwikCash Transfer System company's operators.

Figure 1C:
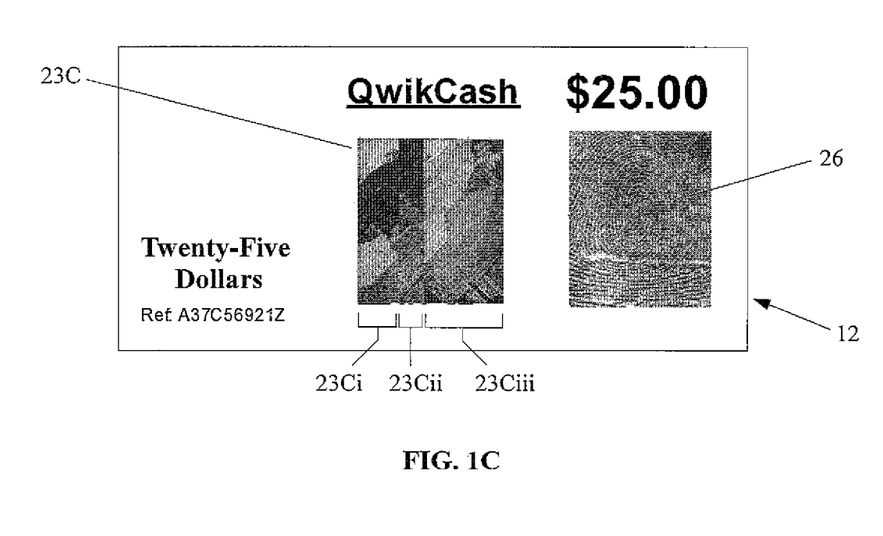
FIG. 1C is a third embodiment of a printed copy of the QwikCash of the current invention, using a randomly generated image (GUID) and having text describing the value associated with it.

In an alternate embodiment, QwikCash 12, shown in FIG. 1C may have a GUID that may comprise a randomly generated image 23C. The images may not themselves necessarily encode data, but may thereby be usable to identify the ticket and its value. The randomly generated image on the face of the ticket may be scannable and identified using image recognition software, which may identify its associated data. Several different images 23Ci, 23Cii, and 23Ciii may be used to identify different parts of the associated data. Also, rather than a PIN code to secure the QwikCash, biometrics may instead be utilized. At the time of purchase, a person may allow their fingerprint to be scanned and be encoded along with the other transaction data. That such biometric was used to secure the QwikCash could be indicated on the ticket's face using a generic fingerprint image 26. This use of biometrics would likely only be desired for the issuance of large monetary amounts. At the time of redemption, a similar scan would be made to verify that the person redeeming the ticket was in fact its legitimate owner. Mobile redemption of the tickets need not be hindered, for the sake of one's concern with the ticket's security, because smart phones are now being produced that incorporate a built-in biometric reader, including, but not limited to, the Motorola Atrix. Where a person seeks to transfer, to a friend or other party (non-merchant), QwikCash that was originally secured using the purchaser's fingerprint, the user may first need to disable the biometric security protection associated with the QwikCash, by submitting an online request through the QwikCash website, and by thereafter sending the unsecured QwikCash to the transferee.

Figure 3:
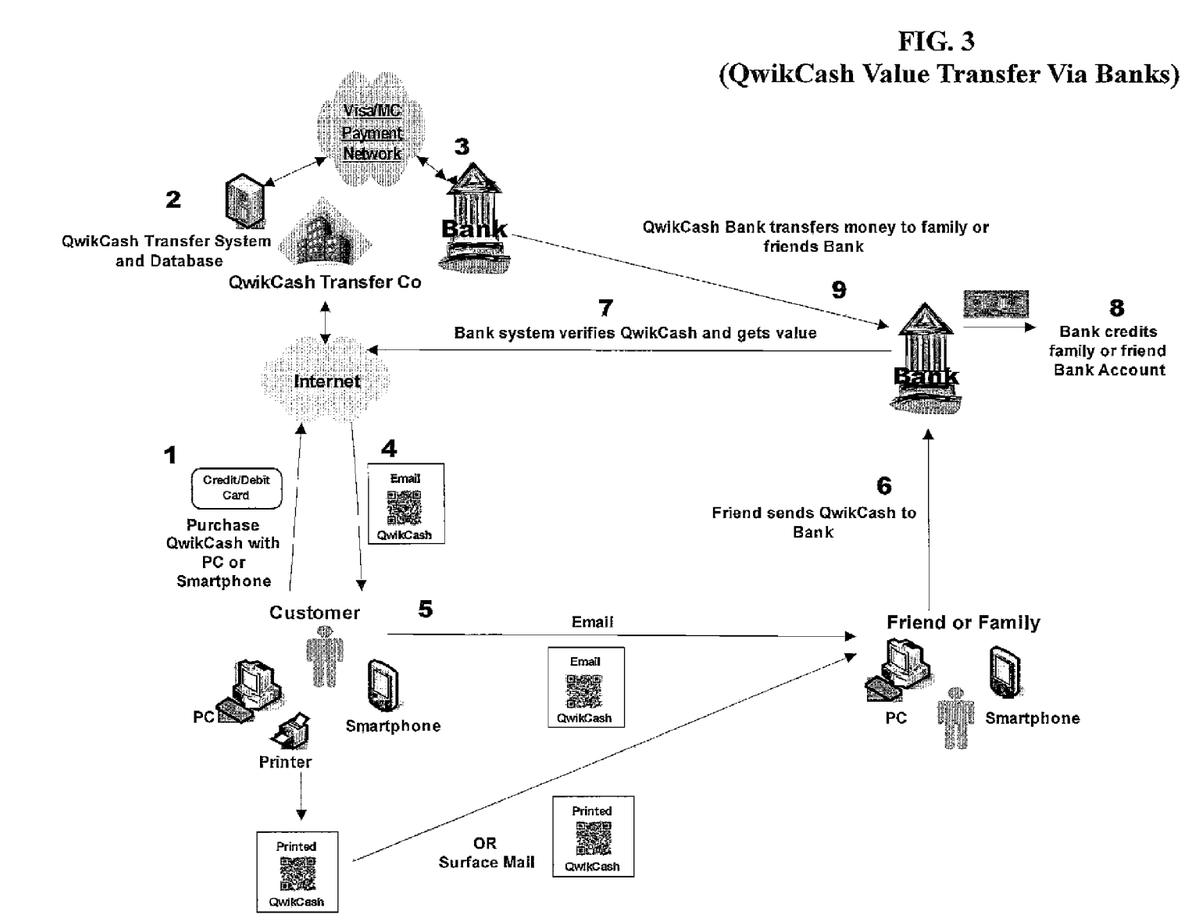
FIG. 3 is a diagram illustrating the steps in the process of a QwikCash value transfer using banks.
Figure 4:
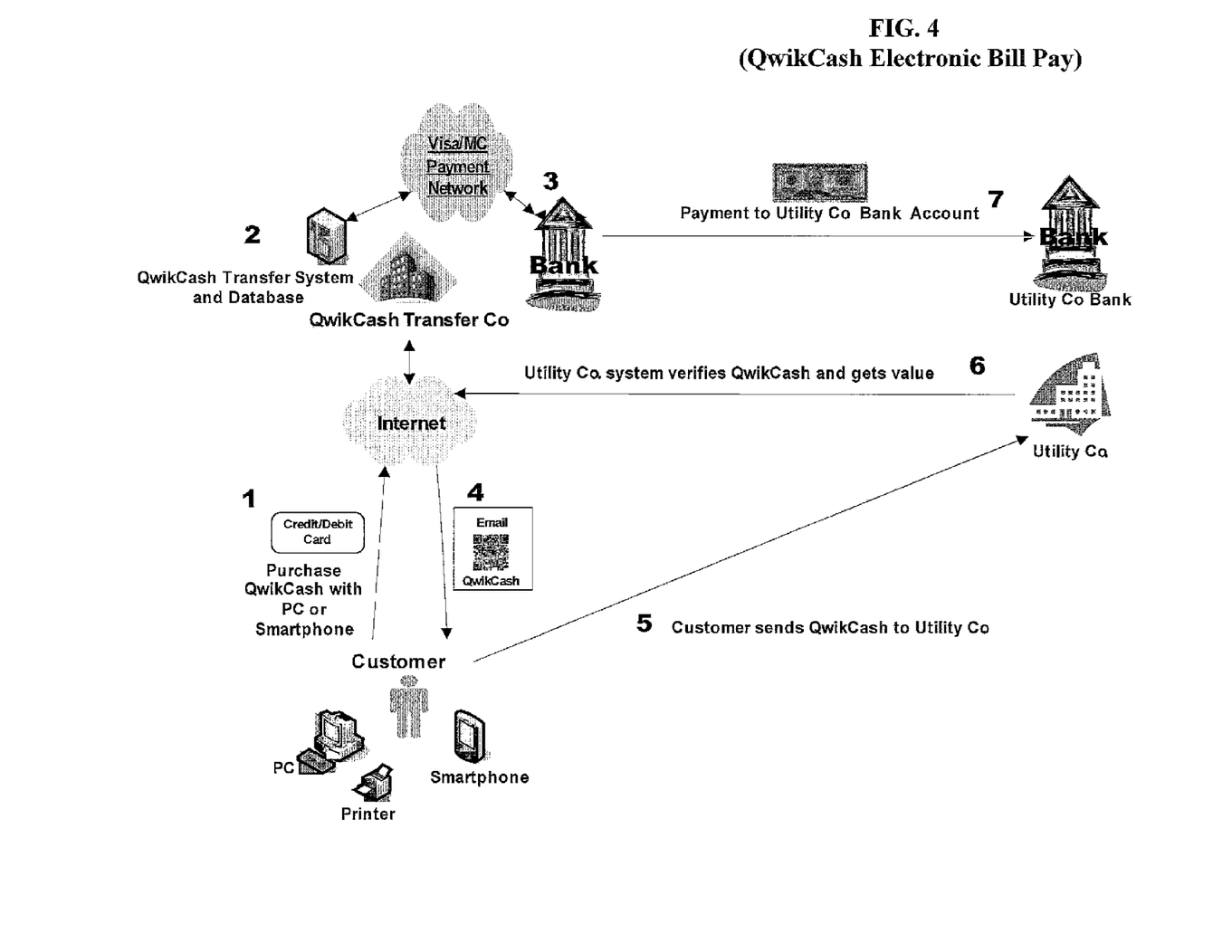
FIG. 4 is a diagram illustrating the steps in the process of paying a bill electronically using QwikCash.

As seen in FIG. 3, the QwikCash of the current invention may be usable by, and deposited to, an account at the ticket holder's bank. This may include a deposit at the bank itself, or a deposit though online banking processes that may be adapted to verify and accept QwikCash. Also, as seen in FIG. 4, the QwikCash of the current invention may be used in electronic bill paying, such as for the paying of a utility bill.

Figure 1D:
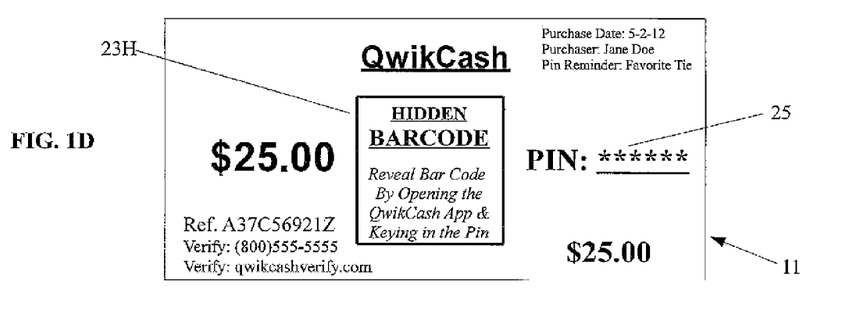
FIG. 1D illustrates an electronic embodiment of the Qwikcash of the current invention, with the QwikCash having a hidden barcode.
Figure 1E:
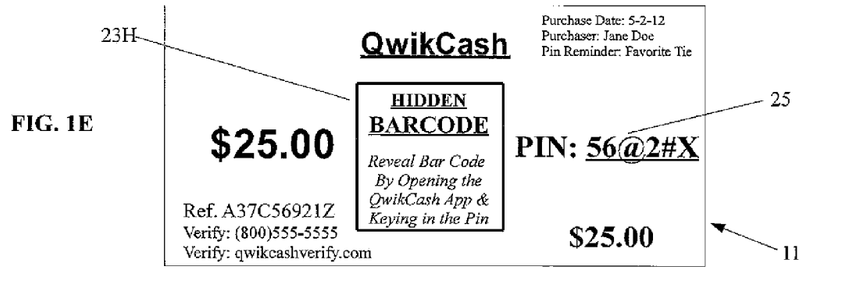
FIG. 1E illustrates the electronic QwikCash embodiment of FIG. 1D, but with the associated personal identification number having been typed into the PIN information box.
Figure 1F:
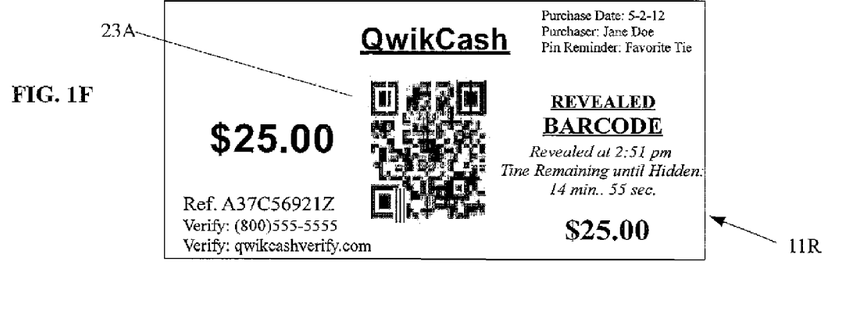
FIG. 1F illustrates the electronic QwikCash embodiment of FIG. 1E, but with PIN having been entered to reveal the barcode for a limited time period.
Figure 8B:
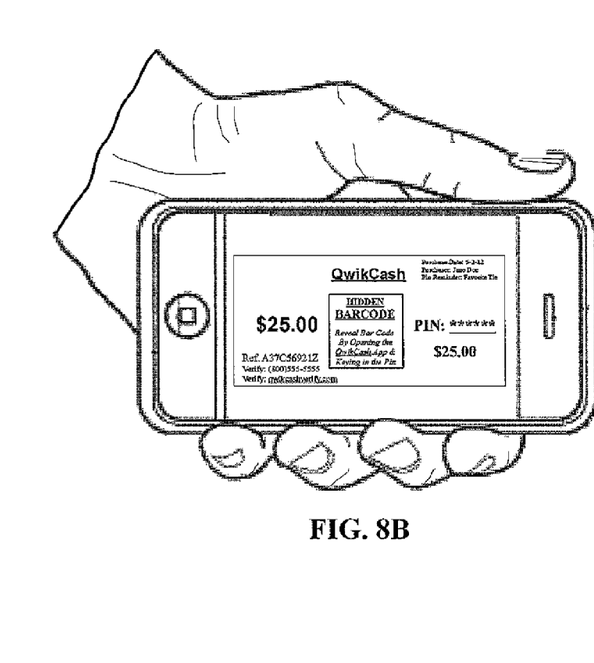
FIG. 8B is a smart phone displaying the electronic QwikCash embodiment of FIG. 1D.

Another security aspect of the QwikCash system of the present invention may comprise a downloadable App for the purchaser's PC or smart phone. The QwikCash App may electronically alter the appearance of the QwikCash Ticket when it is purchased, so that it appears without the GUID, as seen within FIGS. 1D and 8B. In place of the barcode GUID may appear an icon 23H showing the barcode's outline or the barcode/GUID may be camouflaged, and a message may also appear instructing the user how to reveal the barcode Qwik-Cash in order to use the ticket—a use that may be a transfer of the ticket to another individual, or a purchase of a product, or its redemption for dollars. The electronic QwikCash ticket may be used for a transaction by opening the QwikCash App, and keying in the PIN within the appropriate information box in the display, as seen for the QwikCash ticket in FIG. 1E, which, after being entered, may cause the barcode 23A to appear, as seen in FIG. 1F, where it may be freely transferred to a second party by a point-of-sale scanner or another Smartphone. For the Smartphone APP of FIG. 8B, the user may just touch the text "PIN" on the LCD of the phone, and then enter the alpha-numeric personal identification number to reveal the barcode (GUID) and use the QwikCash. As an added security precaution, the App may be programmed to allow the appearance of the bar code only for a preset time period, e.g. for only 15 minutes, a time period which may be shown in the display, as seen in FIG. 1F. After the time period has elapsed, the APP may reset the electronic QwikCash ticket so that the bar code is once again hidden, and the icon 23H is once again displayed, and the QwikCash may not then be freely transferred to a second party until the pin has been re-entered. To aid the user in entering the PIN, which many people are prone to forgetting, the face of the electronic QwikCash ticket may display the purchasers name and the purchase date, and may also display a purchaser-selected PIN-reminder clue, Since the clue will be displayed on the electronic QwikCash ticket, it may preferably be something that only the user may have knowledge of; such as a favorite object or a particular recent event, and not simply be one of the common security questions, such as a mother's maiden name. The PIN, along with the PIN reminder clue on the electronic QwikCash ticket, may be changed using the App, as well as by contacting the QwikCash company by phone, fax, text, e-mail, or in writing.

A further security aspect of the QwikCash System of the current invention may comprise frequent users setting up a user profile to reduce the amount of information they need to enter into the system when purchasing QwikCash as a non-anonymous purchaser. As part of the QwikCash User Profile registration, the user may establish an email account. The QwikCash system may send the user an email with a link in the email that the user must click on to verify the receipt of the email. Once the link in the email is clicked on, a message is sent to the QwikCash system that the QwikCash User Profile has been verified. As part of the QwikCash registration, a User ID and password may be established to protect the profile. After the QwikCash User Profile has been verified, an additional level of protection may be provided by allowing the user to upload his/her photographic image. The picture may be used by the QwikCash system in conjunction with facial recognition software as a security check, at the time of purchase of the QwikCash, or at the time of its redemption, or for both. When the QwikCash patron logs in to the system, the system may scan the user's face and compare it with the picture on file for identification. If the Facial Scan matches the photo on file, the system will allow the user to proceed with a transaction.

Lastly, in addition to a merchant being able to utilize a scanner that is adapted to scan/read the paper or electronic GUID of the QwikCash in its exchange for goods, a bank's ATM machine may be similarly equipped. The possessor of the paper QwikCash ticket or recipient of the electronic QwikCash of FIG. 8A may be able to hold the GUID in front of a scanner at the ATM, and thereby exchange the value of the QwikCash for U.S. or other national currency. It may also be possible to electronically send (e-mail, etc) the electronic QwikCash of FIG. 8A or 8B (after entering the PIN) to the ATM in exchange for currency.

Software of the present invention may run on a computer, a server, a cell phone, tablet, or other smart device, so a description of such an accessorized exemplary computer system is hereinafter disclosed, even though a particular embodiment may not require all of the described components. Exemplary computer system 200 is shown schematically in FIG. 9, and which may comprise computing unit 201 interacting with external peripherals 202, such as a separate touch screen display 244, and interacting with network resources 203, including use of the interne 261, and other computers, which may be first and second laptop computers 262/263, a tablet, a smart phone etc.

Figure 9:
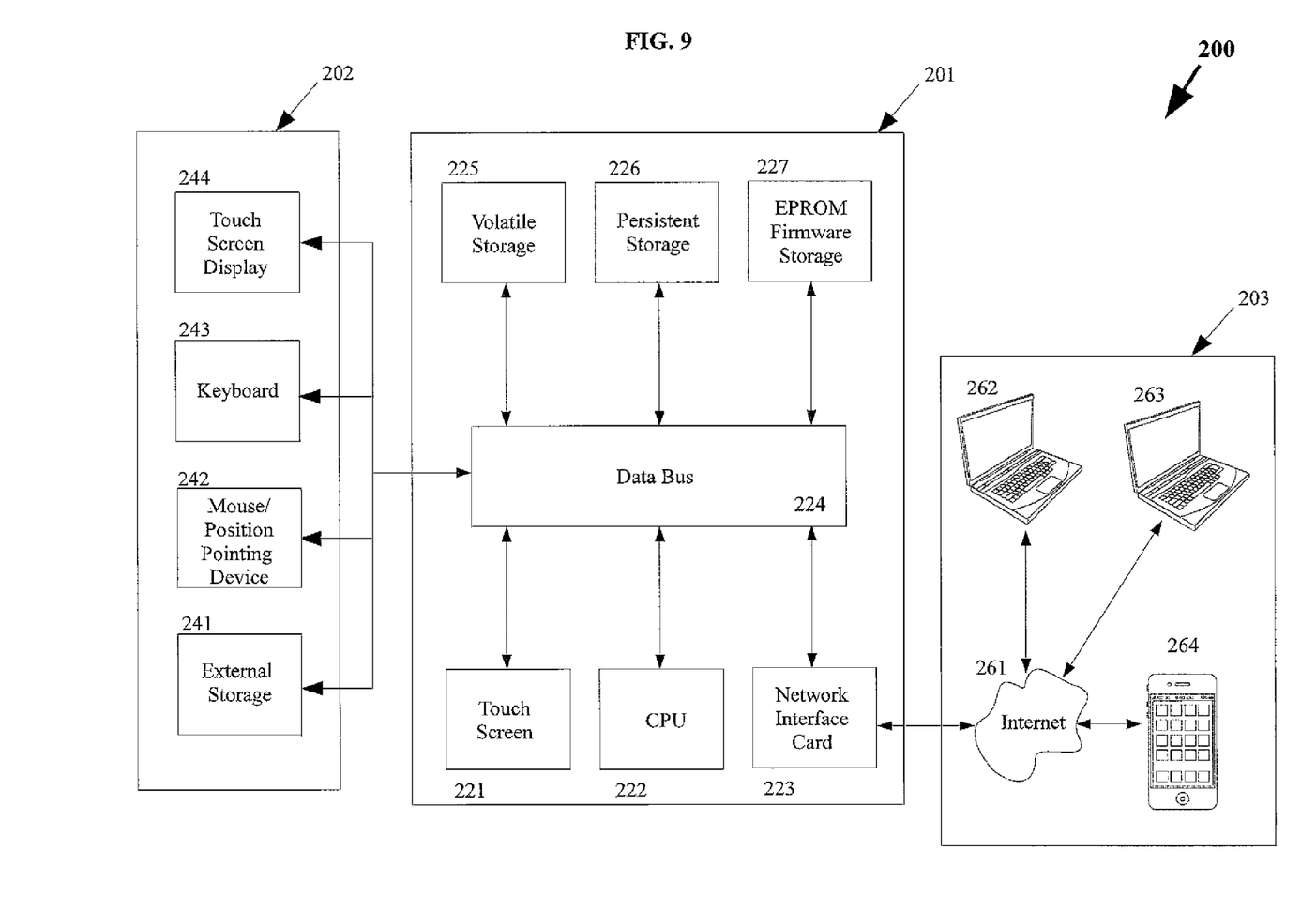
FIG. 9 is a schematic of an exemplary computing unit capable of running the software of the current invention, which may include cellular phones, personal computers and other wired/wireless smart devices, and which may be capable of interacting with external peripherals and other devices over the internet.

The computing unit 201 may include a data bus 224 for communicating information across and among various parts of computing unit 201, and a central processing unit, which may be a microprocessor (hereinafter "processor" or "CPU") 222 coupled with a bus 224 for processing information and performing other computational and control tasks. Computing unit 201 may also include a volatile storage 225, such as a random access memory (RAM) or other dynamic storage device, coupled to bus 224 for storing various information as well as instructions to be executed by processor 222. The RAM may be Dynamic Random Access Memory (DRAM), or Static RAM (SRAM), or any other similar type of RAM known in the art. The volatile storage 225 may also be used for storing temporary variables or other intermediate information during execution of instructions by processor 222. Computing unit 201 may further include a read only memory (ROM) or an erasable programmable memory (EPROM) 227 or other static storage device coupled to bus 224 for storing static information and instructions for processor 222, such as basic input-output system (BIOS), as well as various system configuration parameters. A persistent storage device or non-volatile memory 226, such as a magnetic disk, optical disk, or solid-state flash memory device may be provided and may be coupled to bus 224 for storing information and instructions.

Computing unit 201 may be coupled via bus 224 to an integral display 221, possibly a touch-screen display, for use in displaying information to a user. If desired, computing unit 201 may be coupled via bus 224 to an external display screen 244. An external input device 243 (e.g., a standard keyboard) may be coupled to bus 224 for communicating information and command selections to processor 222. A cursor control device 242, such as a mouse, a trackball, or cursor direction keys, may be used for communicating direction information and command selections to processor 222 and for controlling cursor movement on display 244. An external storage device 241 may be connected to the computing unit 201 via bus 224 to provide an extra or removable storage capacity for the computing unit 201, which may be used to facilitate exchange of data with other computer systems.

Some of the techniques herein may be performed by computing unit 201 in response to processor 222 executing one or more sequences of one or more instructions contained in the volatile memory 225. Execution of the sequences of instructions contained in a memory may cause processor 222 to perform the process steps described herein. In alternative embodiments, specific hard-wired digital circuitry may be used in place of, or in combination with, software instructions to implement the invention.

The term "computer-readable medium" as used herein refers to any medium that participates in providing instructions to processor 222 for execution. The computer-readable medium is just one example of a machine-readable medium, which may carry instructions for implementing any of the methods and/or techniques described herein. Various forms of computer readable media may be involved in carrying one or more sequences of one or more instructions to processor 222 for execution, including non-volatile media (storage device 226), and volatile media (storage device 225). Common forms of computer-readable media include, for example, a floppy disk, a hard disk, magnetic tape, or any other magnetic medium, a CD-ROM, any other optical medium, a RAM, a PROM, an EPROM, a flash drive, and a memory card.

The computing unit 201 may thus also include a communication interface, such as network interface card 223 coupled to the data bus 222. Communication interface 223 may provide a two-way data communication coupling to a network link that may be connected to a local network. For example, communication interface 223 may be an integrated services digital network (ISDN) card or a modem to provide a data communication connection to a corresponding type of telephone line, or it may be a local area network interface card (LAN NIC) to provide a data communication connection to a compatible LAN.

Network link 223 also typically provides data communication to other network resources. For example, the network link may provide a connection over the internet 261 to the world-wide-web. Thus, the computing unit 201 can access resources located anywhere using the Internet 261. Also, the computing unit 201 may also communicate with other computers (e.g. 262-263), cell phones 264, and other smart devices, generally with permission, and which may be located anywhere with access to the internet 261.

The examples and descriptions provided merely illustrate a preferred embodiment of the present invention. Those skilled in the art and having the benefit of the present disclosure will appreciate that further embodiments may be implemented with various changes within the scope of the present invention. Other modifications, substitutions, omissions and changes may be made in the design, size, materials used or proportions, operating conditions, assembly sequence, or arrangement or positioning of elements and members of the preferred embodiment without departing from the spirit of this invention.

We claim:

1. A method of operating a monetary value transfer system for the conveying of monetary value between at least two parties, using a computer system, said method comprising the following steps:

using one or more processors to execute instructions retained in a machine-readable storage media to cause the computer system to cause a display of one or more screens for use in executing said method;

requesting, by a first party, of a total amount of monetary value to be in one or more desired incremental monetary amounts;

providing a payment, by the first party, for said total amount of monetary value;

requesting, by an administrator, of a personal identification number (PIN);

entering, by the first party, of an alpha-numeric-symbolic PIN;

issuing, by the administrator, of one or more QwikCash tickets; each of said one or more QwikCash tickets comprising a machine scannable globally unique identifier (GUID), each of said one or more GUIDs of said one or more QwikCash tickets corresponding respectively to one of said desired incremental monetary amounts, and all of said GUIDs additively corresponding to said total amount of monetary value; each of said QwikCash tickets further comprising a textual reference denoting its incremental monetary amount and comprising a textual reference identifying issuance of said PIN;

activating, by the administrator, of said one or more QwikCash tickets by associating said PIN, within an administrator database in said storage media, with each of said one or more GUIDs of said one or more QwikCash tickets, and with its respective incremental monetary amount;

delivering, by the administrator, of the one or more QwikCash tickets to the first party;

remitting, by the first party to the second party, being a merchant, of at least a first one of said one or more QwikCash tickets in exchange for goods or services;

verifying, by the merchant, of said at least a first QwikCash ticket being active, by scanning, by the merchant, of said GUID of said remitted QwikCash ticket, using point-of-sale scanning equipment, and entering therein of said PIN;

communicating of said scanned GUID and PIN to the administrator;

verifying, by the administrator, of said remitted QwikCash ticket remaining active by comparing said scanned GUID and PIN with said associated GUID and PIN in the administrator database;

receiving, by the merchant, of a reply from the administrator confirming or denying said GUID remaining active for said at least a first QwikCash ticket; and wherein when said remitted QwikCash ticket remains active:

remitting payment, by the administrator, to the merchant; and deactivating, by the administrator, of said GUID of said remitted QwikCash ticket within said administrator database.

2. The method of operating a monetary value transfer system according to claim 1 further comprising:

communicating, by the second party, with the administrator;

requesting, by the second party, for changing of said PIN for said GUID of said at least a first QwikCash ticket to a new PIN;

associating, by the administrator within the administrator database, of said new PIN with said GUID of said at least a first QwikCash ticket, and with its respective incremental monetary amount.

3. The method of operating a monetary value transfer system according to claim 2, wherein said remitting of said at least one QwikCash ticket to the second party comprises mailing of said at least one QwikCash ticket to the second party or delivering a printed copy of said at least one QwikCash ticket to the second party.

4. The method of operating a monetary value transfer system according to claim 3, wherein said GUID consists of an identifier from the group of identifiers consisting of:
- a barcode; and
- a randomly generated image.

5. The method of operating a monetary value transfer system according to claim 4, wherein said sending of said one or more QwikCash tickets to the first party by the administrator comprises: e-mailing or regular mailing of said one or more QwikCash tickets.

6. The method of operating a monetary value transfer system according to claim 5, wherein said communicating of said PIN and said GUID of said at least one QwikCash ticket to the administrator consists of communication from the group of communications consisting of:
- phoning the administrator and providing a reference number appearing on said at least one QwikCash ticket and giving said PIN;
- e-mailing of said PIN and said GUID of said at least one QwikCash ticket to the administrator; and
- accessing the website of the administrator over the internet to thereby submit said PIN and said GUID of said at least one QwikCash ticket.

7. The method of operating a monetary value transfer system according to claim 6 wherein each of said one or more QwikCash tickets further comprise a textual display of the name of the first party and display of a PIN-reminder clue.

8. The method of operating a monetary value transfer system according to claim 7, further comprising registering, by the first party, with the administrator by accessing a web page hosted by the administrator and entering personal information.

9. The method of operating a monetary value transfer system according to claim 8, wherein when said GUID comprises said barcode, said GUID is read by a barcode scanner; and wherein when said GUID comprises said randomly generated image, said GUID is read using a scanner and image recognition software.

10. The method of operating a monetary value transfer system according to claim 9 further comprising associating, by the administrator, of a photographic image of the first party with the GUID and PIN, within the administrator database; and wherein said remitting further comprises providing a current photographic image of the first party, and comparing of said current photographic image with said associated image within the administrator database, using facial recognition software.

11. The method of operating a monetary value transfer system according to claim 9 further comprising associating, by the administrator, of biometric data of the first party with the GUID and PIN within the administrator database.

12. The method of operating a monetary value transfer system according to claim 1 wherein when said GUID comprises a barcode, said barcode comprising a QR barcode.

13. The method of operating a monetary value transfer system according to claim 12 further comprising encrypting, within said QR barcode, of one or more of: said PIN, a currency type used for said payment, a payment date, a reference number, a name of said first party, and an email address of said first party.

14. The method of operating a monetary value transfer system according to claim 12 further comprising electronically camouflaging said GUID on said one or more QwikCash tickets, by said instructions, during said issuing by the administrator.

15. The method of operating a monetary value transfer system according to claim 14 further comprising keying in said PIN and revealing said camouflaged GUID for a preset amount of time.

16. A method of operating a monetary value transfer system for the conveying of monetary value between at least two parties, using a computer system, said method comprising the following steps:
- using one or more processors to execute instructions retained in a machine-readable storage media to cause the computer system to cause a display of one or more screens for use in executing said method;
- requesting, by a first party, of a total amount of monetary value to be in one or more desired incremental monetary amounts;
- providing a payment, by the first party, for said total amount of monetary value;
- requesting, by an administrator, of a personal identification number (PIN);
- entering, by the first party, of an alpha-numeric-symbolic PIN;
- issuing, by the administrator, of one or more QwikCash tickets; each of said one or more QwikCash tickets comprising a machine scannable globally unique identifier (GUID), each of said one or more GUIDs of said one or more QwikCash tickets corresponding respectively to one of said desired incremental monetary amounts, and all of said GUIDs additively corresponding to said total amount of monetary value; each of said QwikCash tickets further comprising a textual reference denoting its incremental monetary amount and comprising a textual reference identifying issuance of said PIN;
- activating, by the administrator, of said one or more QwikCash tickets by associating said PIN, within an administrator database in said storage media, with each of said one or more GUIDs of said one or more QwikCash tickets, and with its respective incremental monetary amount;
- delivering, by the administrator, of the one or more QwikCash tickets to the first party;
- remitting, by the first party to the second party, being a bank, of at least a first one of said one or more QwikCash tickets, by electronically sending said PIN and said GUID of said remitted QwikCash ticket to the bank;
- verifying, by the bank, of said remitted QwikCash ticket remaining active by communicating of said GUID and PIN to the administrator;
- verifying, by the administrator, of said remitted QwikCash ticket remaining active by comparing said communicated GUID and PIN with said associated GUID and PIN in the administrator database;
- receiving, by the merchant, of a reply from the administrator confirming or denying said GUID remaining active for said at least a first QwikCash ticket; and wherein when said remitted QwikCash ticket remains active:
remitting payment, by the administrator, to the bank;
delivering cash, by the bank, to the first party at an automated teller machine; and
deactivating, by the administrator, of said GUID of said remitted at least one QwikCash ticket within the administrator database.

17. A method of operating a monetary value transfer system for the conveying of monetary value between at least two parties, said method comprising:
requesting, by a first party, of a total amount of monetary value to be in one or more desired incremental monetary amounts;
providing a payment, by the first party, for said total amount of monetary value;
requesting, by an administrator, of a personal identification number (PIN);
supplying, by the first party, of an alpha-numeric-symbolic PIN;
issuing, by the administrator, of a QwikCash ticket; said QwikCash ticket comprising a machine scannable globally unique identifier (GUID), said GUID of said QwikCash ticket corresponding to said total amount of monetary value, said QwikCash ticket further comprising a textual reference denoting said monetary value and comprising a textual reference identifying issuance of said PIN;
activating, by the administrator, of said QwikCash ticket by associating said PIN, within an administrator database in said storage media, with said GUID of said QwikCash ticket;
delivering, by the administrator, of said QwikCash ticket to the first party;
remitting, by the first party, of said PIN and said QwikCash ticket to a second party;
verifying, by the second party, of said QwikCash ticket being active, by communicating said PIN and said GUID of said QwikCash ticket to the administrator;
receiving a reply from the administrator confirming or denying said GUID remaining active for said QwikCash ticket;
communicating, by the second party, with the administrator, and requesting, by the second party, for changing of said PIN for said GUID of said at least a first QwikCash ticket to a new PIN; and
associating, by the administrator within the administrator database, of said new PIN with said GUID of said at least a first QwikCash ticket, and with its respective incremental monetary amount.

18. The method of operating a monetary value transfer system according to claim 17 further comprising delivering of said QwikCash ticket, by the administrator to the first party, by a delivery system from the group of delivery systems consisting of: vending of said QwikCash ticket from a vending machine; and printing of said ticket by a printer.

* * * * *